US007020289B1

(12) United States Patent
Riggs

(10) Patent No.: US 7,020,289 B1
(45) Date of Patent: *Mar. 28, 2006

(54) REMOTE CONTROL INTERFACE FOR REPLACEMENT VEHICLE STEREOS

(75) Inventor: Brett D. Riggs, Placentia, CA (US)

(73) Assignee: P. B. Clarke & Associates, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/552,981

(22) Filed: Apr. 21, 2000

Related U.S. Application Data

(63) Continuation-in-part of application No. 09/442,627, filed on Nov. 17, 1999.

(60) Provisional application No. 60/108,711, filed on Nov. 17, 1998.

(51) Int. Cl.
H04B 1/00 (2006.01)
H04R 3/00 (2006.01)
H04Q 1/50 (2006.01)

(52) U.S. Cl. .................. 381/86; 381/110; 710/73; 340/825.24; 340/825.25

(58) Field of Classification Search .............. 381/110, 381/86, 302; 369/2; 701/36; 704/275; 710/64, 67, 72, 73
See application file for complete search history.

(56) References Cited

U.S. PATENT DOCUMENTS

| | | |
|---|---|---|
| 2,133,151 A | 10/1938 | Rittenhouse |
| 2,926,240 A | 2/1960 | Gollub |
| 2,941,173 A | 6/1960 | Gollub |
| 2,973,431 A | 2/1961 | Sontheimer |
| 3,099,797 A | 7/1963 | Piccinini |
| 3,544,901 A | 12/1970 | Wood |
| 4,194,155 A | 3/1980 | Hirai et al. |
| 4,291,411 A | 9/1981 | Muller et al. |
| 4,362,907 A | 12/1982 | Polacsek |
| 4,455,454 A | 6/1984 | Umebayashi |
| 4,501,013 A | 2/1985 | Sato |
| 4,503,513 A | 3/1985 | Pogue, Jr. |
| 4,551,714 A | 11/1985 | Giammarese |
| 4,602,358 A | 7/1986 | Sato |
| 5,319,803 A | 6/1994 | Allen |
| 5,339,362 A | 8/1994 | Harris |
| 5,515,345 A | 5/1996 | Barreira et al. |
| 5,555,502 A | 9/1996 | Opel |
| 5,559,499 A | 9/1996 | Haubner |
| 5,691,710 A * | 11/1997 | Pietraszak et al. ..... 340/825.72 |
| 5,781,123 A | 7/1998 | Koenig et al. |
| 5,790,065 A | 8/1998 | Yaroch |
| 5,790,481 A * | 8/1998 | Meitner .................. 369/2 |

(Continued)

Primary Examiner—Vivian Chin
Assistant Examiner—Andrew Graham
(74) Attorney, Agent, or Firm—Knobbe, Martens, Olson & Bear LLP

(57) ABSTRACT

An interface device for interconnecting fixed controls of a vehicle to a replacement stereo. The interface device is capable of receiving control signals from fixed controls, such as steering wheel controls, backseat controls, handlebar controls, and the like, and then transmitting corresponding control signals to a replacement stereo. In one embodiment, the output signals from the interface device are comprised of wireless signals, such as IR signals. In another embodiment, the interface device is programmable such that the interface device can be programmed to emit signals corresponding to the same signals that would be emitted from a handheld remote control sold in conjunction with an after-market stereo receiver. In another embodiment, the interface device is capable of recognizing spoken voice commands and generating corresponding IR signals in order to effect control of a replacement stereo.

21 Claims, 11 Drawing Sheets

U.S. PATENT DOCUMENTS

| | | |
|---|---|---|
| 5,903,259 A | 5/1999 | Brusky et al. |
| 5,949,149 A * | 9/1999 | Shitanaka et al. ......... 307/10.1 |
| 5,950,166 A * | 9/1999 | Hab-Umbach et al. ..... 704/275 |
| 5,999,104 A * | 12/1999 | Symanow et al. ..... 340/825.22 |
| 6,097,520 A | 8/2000 | Kadnier |
| 6,114,970 A * | 9/2000 | Kirson et al. .......... 340/825.52 |
| 6,119,088 A * | 9/2000 | Ciluffo ....................... 704/275 |
| 6,397,186 B1 * | 5/2002 | Bush et al. ................. 704/274 |

* cited by examiner

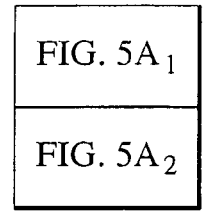
FIG. 5A
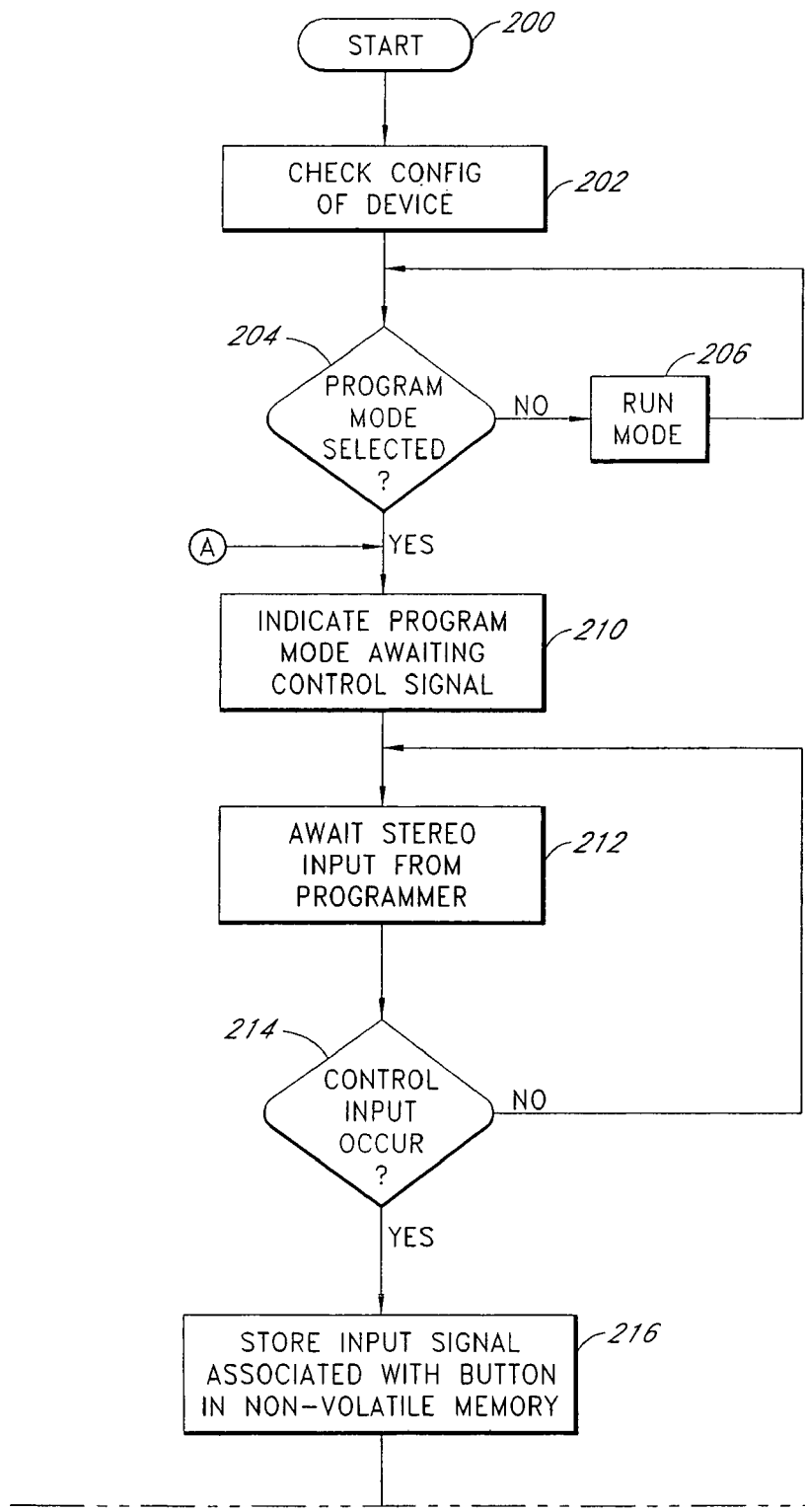
FIG. 5A₁

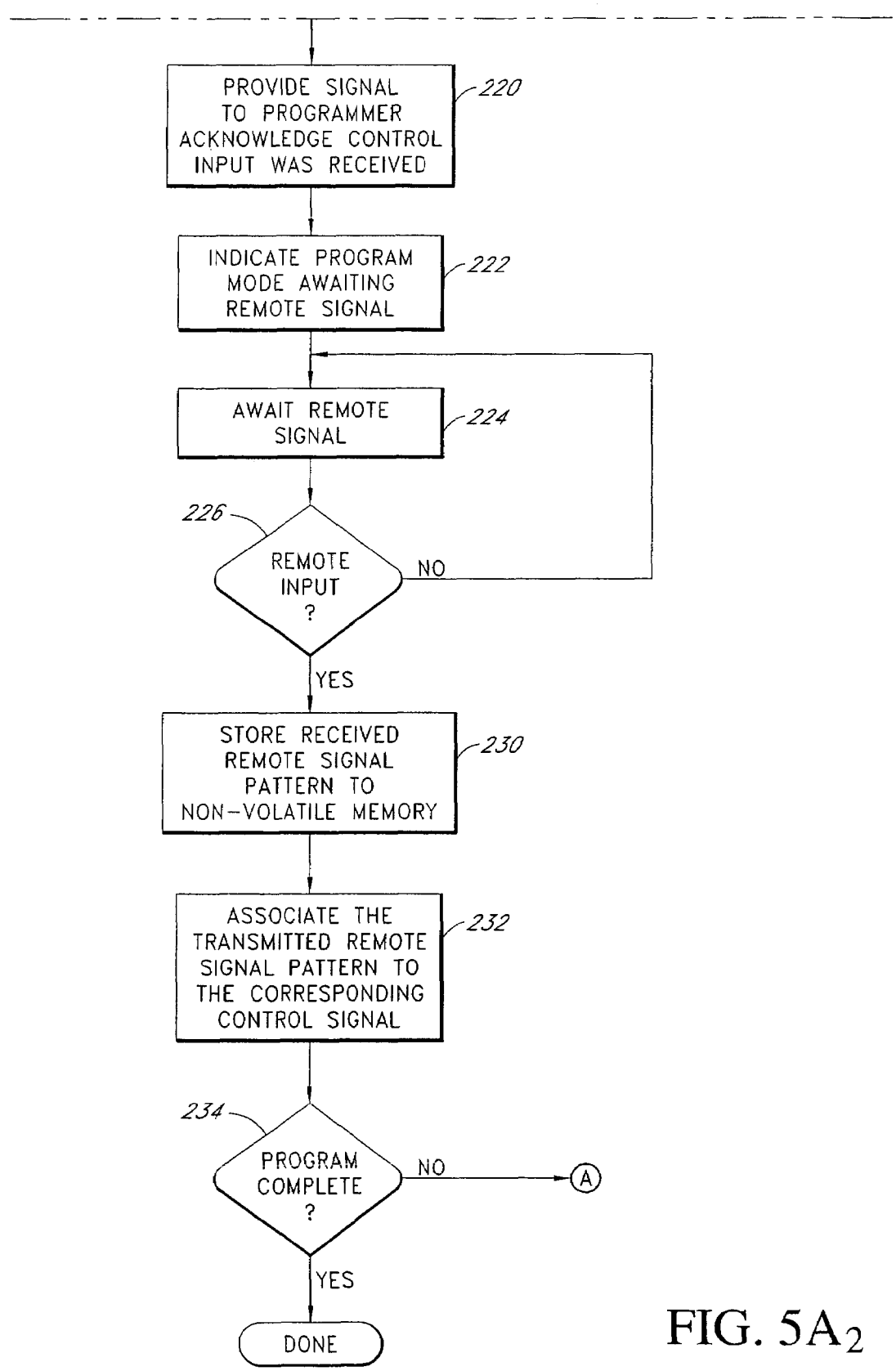
FIG. 5A₂

REMOTE CONTROL INTERFACE FOR REPLACEMENT VEHICLE STEREOS

RELATED APPLICATIONS

This is a continuation in part of U.S. patent application Ser. No. 09/442,627 filed Nov. 17, 1999 which claims benefit of 60/108,711 Nov. 11, 1998.

BACKGROUND OF THE INVENTION

1. Field of the Invention

The present invention relates to motor vehicle accessories and, in particular, concerns a device adapted to permit the use of after-market replacement stereos with factory installed remote stereo controls, such as steering wheel stereo controls and/or voice commands.

2. Description of the Related Art

Vehicles, such as automobiles, boats, and motorcycles, are often equipped with a stereo system at the factory. Over time, vehicles have been equipped with increasingly more sophisticated stereo systems that provide better sound performance and more features. These stereo systems are quite complex and are capable of playing cassette tapes and CDs and also provide radio reception.

Typically, the control units or receivers for these stereos are positioned adjacent the driver's seat of the vehicle such that the driver can manipulate the stereo controls while driving. While the stereo controls are typically positioned somewhat adjacent the driver, the stereo controls are generally not within the driver's field of view and also may require the driver to remove their hand from the steering wheel or handlebars of the vehicle in order to manipulate the stereo controls. This can create a potentially dangerous situation as the driver is now no longer grasping the driving controls with both hands and the driver's attention has been diverted from the path of travel of the vehicle to the stereo controls. Numerous accidents occur as a result of the driver directing their attention away from safely operating the vehicle.

Moreover, the typical location for stereo controls is relatively inaccessible to some of the passengers. For example, if the stereo controls are located adjacent the driver in the front seat of a passenger automobile, the passengers in the back seat may not be able to access the controls to change the operation of the stereo.

To address these particular needs, vehicle manufacturers have begun to offer vehicles that have local stereo control buttons that are not positioned adjacent the stereo receiver but are positioned in more favorable locations for driver or passenger manipulation of the stereo controls. For example, many current production automobiles incorporate local stereo controls mounted on the steering wheel of the vehicle. These local stereo controls typically comprise push-button switches that allow the user to control the operation of the stereo, e.g., increase or decrease volume, change channels or change play format, by manipulating switches on the steering wheel. These types of local stereo controls reduce the likelihood that the driver's attention will be drawn away from the path of travel of the vehicle or from the operation of the vehicle while adjusting the stereo.

Similarly, many passenger vehicles also incorporate local stereo controls that are located remotely from the stereo receiver in locations where passengers can control the operation of the stereo by manipulating the remote stereo control buttons. For example, some larger vehicles incorporate stereo control buttons positioned adjacent the backseat passenger location such that passengers can control the operation of the stereo unit that is mounted adjacent the driver in the front seat.

While these local stereo controls improve the flexibility of controlling the stereo unit, these local stereo controls are generally rendered inoperable when the originally installed stereo receiver is replaced with a replacement stereo receiver. Oftentimes, the owners of vehicles become dissatisfied with the originally installed stereo and want to replace the originally installed stereo with a different after-market stereo unit. Typically, replacement stereo units are of higher quality and offer greater performance characteristics than the originally installed stereo unit. In addition, after-market stereos are typically less expensive than comparable factory stereos and offer a more economical replacement in case the original unit is stolen or damaged.

However, installing these after-market stereo units typically renders the local stereo control buttons inoperable as these local stereo control buttons or switches are connected to the original stereo control unit or receiver via a hardwired assembly that is specifically designed to connect these local control buttons to the stereo control unit. The typical replacement stereo receiver is not typically configured to be able to readily connect or function with the hardwired local stereo controls.

One possible solution to this problem is to provide a handheld wireless remote control unit along with the replacement stereo receiver wherein the replacement stereo receiver is adapted to receive wireless signals from the handheld remote control unit. The person holding the handheld remote control unit can then control the operation of the replacement stereo unit without touching the controls on the front face of the stereo receiver. While a handheld remote control unit allows for people positioned remotely from the stereo receiver to control the operation of the replacement stereo, the handheld remote control devices are generally unsatisfactory for many vehicle drivers and passengers.

In particular, the handheld remote control device is easily misplaced or lost or is not readily accessible to the driver or the passenger while the vehicle is in operation. Moreover, the handheld remote control device often requires the driver or the passenger to specifically point the device in the direction of the replacement stereo receiver so that the receiver can receive the appropriate wireless signal to change the operation of the stereo. If the driver of the vehicle is using the remote control, the driver may have to take their attention away from the path of travel of the vehicle and the operation of the vehicle, locate the appropriate buttons on the handheld remote control, and then point the handheld remote control in the direction of the stereo control receiver. Hence, while these handheld remote control units allow for remote control of a replacement stereo, they still do not provide the convenience of the local controls positioned in the vehicle that are adapted to be used in conjunction with the original stereo system.

Recent advances in voice recognition technology and vehicle quieting have made it possible to implement voice activated controls in motor vehicles. The 2000 S Type Jaguar offers such a system as a factory option. A voice recognition system is able to recognize the sound pattern of a spoken word or phrase and enact a corresponding action such as turning on high beams, locking a door, increasing the volume of a stereo, etc. However, as a factory installed feature, typical voice command systems suffer the same limitations as local stereo controls; they work well with the factory-supplied features, but typically will not readily function with after-market equipment. Some replacement stereos are available with included voice recognition features, however, these stereos tend to be quite expensive and the voice recognition only works with that particular stereo.

From the foregoing, it will be appreciated that there is a need for a system that will allow existing local stereo controls to be used to control a replacement stereo system. To this end, there is a need for a system that will receive signals from local stereo control switches mounted within the vehicle designed to control the originally installed stereo and then provide appropriate signals to a subsequently installed stereo receiver. Furthermore, there is also a continuing need for a method to economically retrofit a voice recognition system to effectively control a variety of after market stereo systems and the like.

SUMMARY OF THE INVENTION

The aforementioned needs are satisfied by the stereo control interface device of the present invention. In one aspect, the device is adapted to receive signals from local stereo controls located at positions within a vehicle that are remote from the stereo control unit or receiver and then translate the signals from the existing local stereo controls and produce output signals in a format which will change the function of the replacement stereo in the same manner that manipulation of the local controls would change the original stereo.

In one particular embodiment, the local stereo controls comprise one or more switches or buttons located remotely from the stereo control unit which a user, such as a driver, can manipulate to control the operation of the stereo control unit. In this aspect, the local stereo control switches provide a signal to the interface device via hardwiring and the interface is adapted to receive the signal and then produce a corresponding wireless signal that is transmitted to a wireless receiver on the after-market replacement stereo control unit such that manipulation of the local stereo controls results in a corresponding control signal being sent to the after-market replacement stereo.

In another aspect of the invention, the interface device is adapted to be programmable. The user can install the interface device and then program the interface to produce output signals that, when received by the replacement stereo control unit, will result in the stereo control performing an operation that corresponds to the operation activated by the local control positioned within the vehicle.

In another aspect of the invention, an interface device is provided that is adapted to receive command signals from remote locations and then provide corresponding signals to a stereo receiver so as to change the function and operation of the stereo receiver. In one particular aspect, the interface device recognizes audio commands and then produces corresponding signals that are recognizable by the stereo receiver. In one particular embodiment, the interface device is adapted to be used with replacement, after market stereo receivers that are adapted to receive wireless signals so as to permit remote control of the stereo receiver. The interface device is adapted to transmit wireless signals, such as IR signals, to the stereo receiver so as to control the function of the stereo receiver. In one embodiment, the interface device is designed to be programmable such that the interface can be taught to recognize particular spoken commands and send corresponding wireless signals to the aftermarket stereo receiver.

It will be appreciated that the interface device is designed to permit remote operation of the stereo receiver either through the use of existing remote controls or through the use of voice commands. The interface device is designed to permit the use of remote signals with aftermarket stereo receivers which permits replacement of originally installed stereo control units.

It will be appreciated that the interface of the present invention allows for local stereo control devices, such as steering wheel switches or buttons, handlebar switches, or passenger switches, to continue to be used with replacement after-market stereo control units that are replacing the originally installed stereo control unit. The flexibility of using this device, in at least one aspect, is enhanced due to the interface being programmable by the installer. The additional ability to recognize voice commands and use them to control the features of a replacement stereo offers an additional convenience to the user. These and other objects and advantages of the present invention will become more fully apparent from the following description taken in conjunction with the accompanying drawings.

BRIEF DESCRIPTION OF THE DRAWINGS

FIG. 5A is an exemplary flow chart illustrating the operation of a microcontroller of the remote stereo control interface device in a program mode;

DETAILED DESCRIPTION OF THE PREFERRED EMBODIMENT

Figure 1:
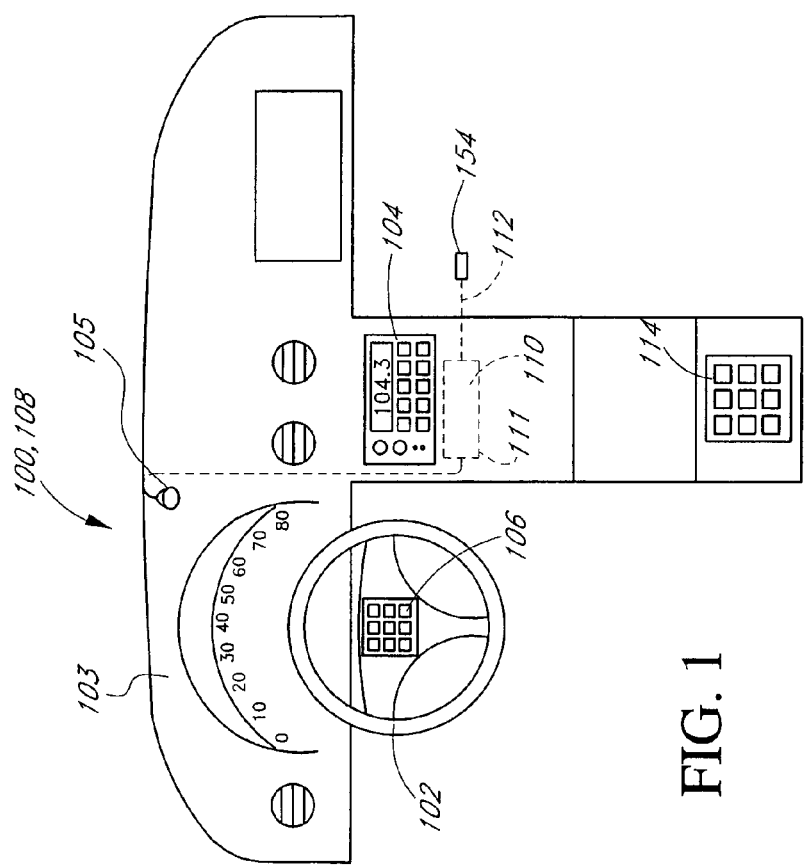
FIG. 1 is an isometric view of a typical vehicle dashboard incorporating local stereo control buttons located on a steering wheel of the dashboard and located adjacent the backseat and further including an interface device and a replacement stereo control unit or receiver.

Reference will now be made to the drawings wherein like numerals refer to like parts throughout. FIG. 1 illustrates a perspective view of an exemplary vehicle interior incorporating the components of a remote stereo control interface system 100. The remote stereo control interface system 100 is comprised of factory installed local stereo controls 106 generally located in the center hub of a typical vehicle steering wheel 102. The local stereo controls 106 are used for the driver to make selections to a replacement after-market in-dash stereo 104, wherein these selections may include AM/FM, seek, volume up, volume down, play, etc.

The advantage of making these desired selections with the local stereo controls 106 is to reduce the occurrence of the driver moving his or her eyes away from the road or hands away from the steering wheel 102 when making selections at the in-dash stereo 104. Hence, the local stereo controls 106 are installed in the factory to give the driver greater convenience in controlling the operation of the factory installed stereo while driving. These local stereo controls 106 are typically hardwired to the factory installed stereo receiver such that replacement of the factory installed stereo receiver typically disables the local stereo controls 106. However, as will be described in greater detail below, a remote interface circuit 110 is adapted to be connected to the existing local stereo controls 106 and communicate with a replacement in-dash stereo 104 that replaces the original stereo receiver such that the existing local stereo controls 106 can be used to control the operation of the replacement in-dash stereo 104.

In particular, the local stereo controls 106 are hardwired to the remote interface circuit 110 which is illustrated in phantom lines and is described in greater detail in reference to FIGS. 4A, 4B and 4C below. The remote interface circuit 110, in this embodiment, is positioned within a casing 111 that is rectangular in shape, approximately 4.0 inches long, 2.0 inches wide and 2.0 inches in height. As is illustrated in FIG. 1, the casing 111 is adapted to be mounted unobtrusively behind the dashboard 103 of the vehicle so as to be generally hidden from view. The remote interface circuit 110 is adapted to be connected to the local stereo controls 106 via the existing hardwiring of the vehicle and is also adapted to send signals to the replacement in-dash stereo 104 via a transmission cable 112. In this embodiment, the transmission cable 112 includes an output signal transmitter 154 (See, FIG. 3) that is located in line of sight of a remote signal receiver (not shown) on the after-market in-dash stereo 104. The transmission cable 112 is illustrated with phantom lines and is generally 4 feet in length and is located in the vehicle dashboard 103 such that the tip of the transmission cable 112 that is comprised of the output signal transmitter 154 is positioned generally within close proximity of the in-dash stereo 104.

Generally, the replacement in-dash stereo 104 is used in place of an original stereo receiver, such as the factory installed stereo receiver, that has been stolen or has become defective or out-of-date. It is fairly common that the replacement in-dash stereo 104 is lower in price and/or includes additional features over the original receiver. The replacement in-dash stereo 104 can be any of a number of after-market receivers, such as those manufactured by Panasonic, Clarion, Denon, Eclipse, JVC, Kenwood, Pioneer, Sony, etc. The typical after-market in-dash stereo 104 is equipped with a wireless receiver, such as an infrared (IR) receiver, that is adapted to receive wireless signals from a handheld remote control 160. This enables the driver to use a handheld remote control 160 to adjust the stereo's operation, e.g., change channels, volume, etc. As will be described in greater detail below, the remote interface circuit 110 is adapted to be programmed to produce wireless signals similar to those produced by the handheld remote control 160 that are recognizable by the after-market in-dash stereo 104 upon receipt of the corresponding signals from the local stereo controls 106.

The remote interface circuit 110 can also be adapted to connect with one or more alternative local stereo controls 114, illustrated in FIG. 1, wherein the alternative local controls 114 are positioned, in this embodiment, adjacent the rear seating area of the vehicle. The alternative local stereo controls 114 are shown in an exemplary location and it can be appreciated that the alternative local stereo controls 114 may be positioned almost anywhere in the vehicle suitable for remote function selection. These types of alternative local stereo controls 114 are typically positioned so that people sitting remotely from the in-dash stereo 104 can still control the basic functions of the in-dash stereo 104 such as changing the program, the channel, the volume, etc.

The remote interface circuit 110 is connected to the existing hardwiring of the alternative local stereo controls 114 and is then programmed to provide appropriate signals to the replacement in-dash stereo 104 so as to be able to provide commands to the replacement in-dash stereo 104 corresponding to the commands of the selected alternative local controls 114. Hence, the remote interface circuit 110 can be used to receive signals from alternative local stereo controls 114 located anywhere within a vehicle such that the alternative local stereo controls 114 can be used to control a replacement in-dash stereo 104.

Figure 2B:
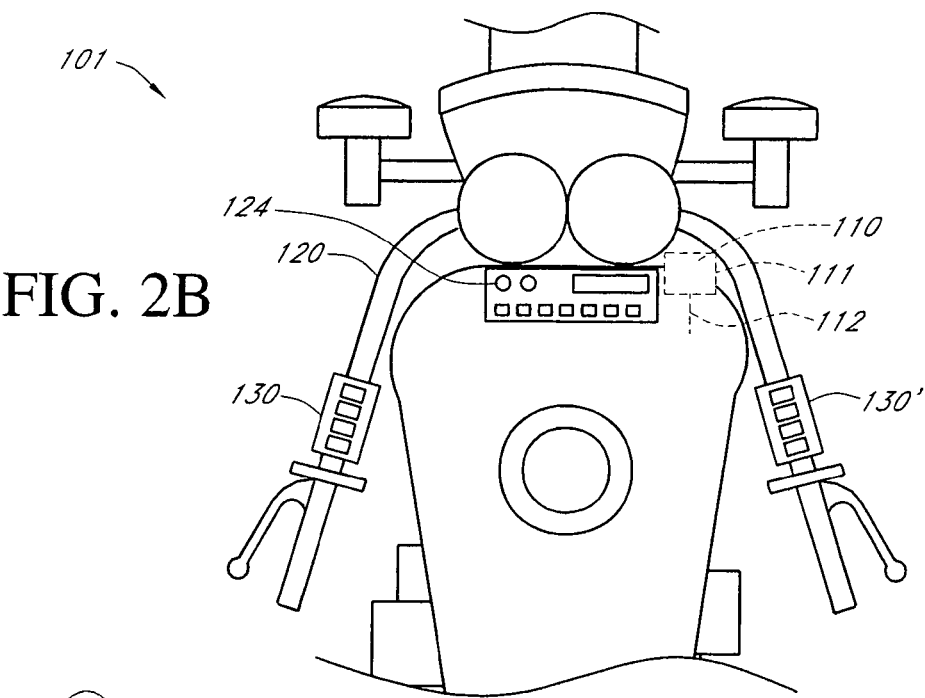
FIGS. 2A and 2B are top isometric illustrations of a motorcycle incorporating local stereo controls mounted on the handlebars of the motorcycle and an interface device that allows for the communication of signals from the local stereo controls to a replacement stereo receiver.
Figure 2A:
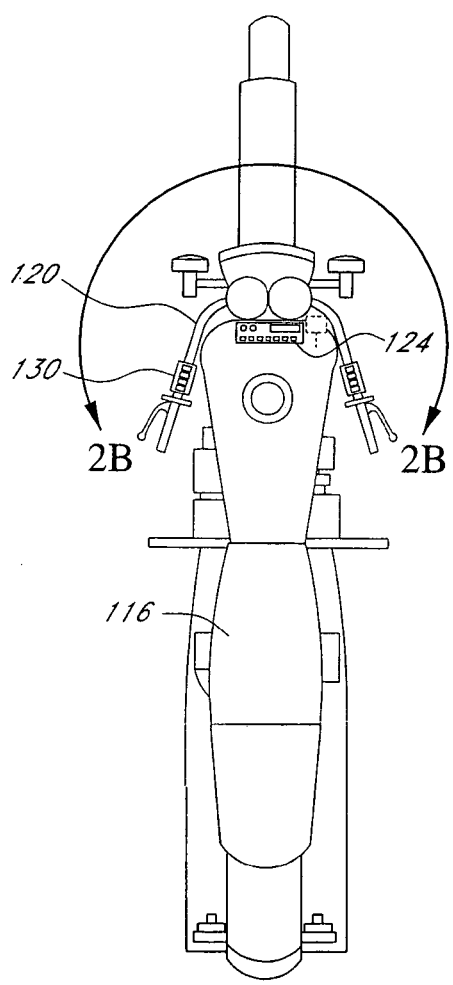

FIGS. 2A and 2B illustrate another embodiment of a remote stereo control interface system 101, substantially similar to the remote stereo control interface system 100 that is shown in FIG. 1. In particular, FIG. 2A illustrates a top view of a typical motorcycle 116 with handlebars 120 for steering. It is commonly known that expensive stereo systems are used on many high-end motorcycles 116. Oftentimes, the motorcycle 116 is equipped with handlebar stereo controls 130 positioned on the handlebars 120 so that the rider does not have to remove his or her hands from the handlebars 120 of the motorcycle 116 while changing radio channels, adjusting volume, adjusting play selection, and the like. However, these handlebar stereo controls 130 are also typically hardwired to the existing factory installed stereo receiver such that replacement of the factory installed stereo receiver often results in the handlebar stereo controls 130 being rendered inoperative.

The remote stereo control interface system 101 can be adapted to utilize the factory mounted handlebar stereo controls 130 with a replacement stereo receiver 124 by receiving the signals from the handlebar stereo controls 130 and transmitting a corresponding signal that is recognizable by the replacement stereo receiver 124 mounted on the motorcycle 116. In particular, the remote stereo control interface system 101 also includes the remote interface circuit 110 that is positioned within the casing 111 (shown in phantom) that is hardwired to the existing handlebar stereo controls 130. The remote interface circuit 110 includes the transmission cable 112 that is positioned so that the output signal transmitter 154 is positioned generally within close proximity of the replacement stereo receiver 124. As discussed above, the replacement stereo receiver 124 is preferably equipped to receive wireless signals, such as IR signals, from the output signal transmitter 154 to change or adjust the replacement stereo receiver 124 operation.

Figure 3:
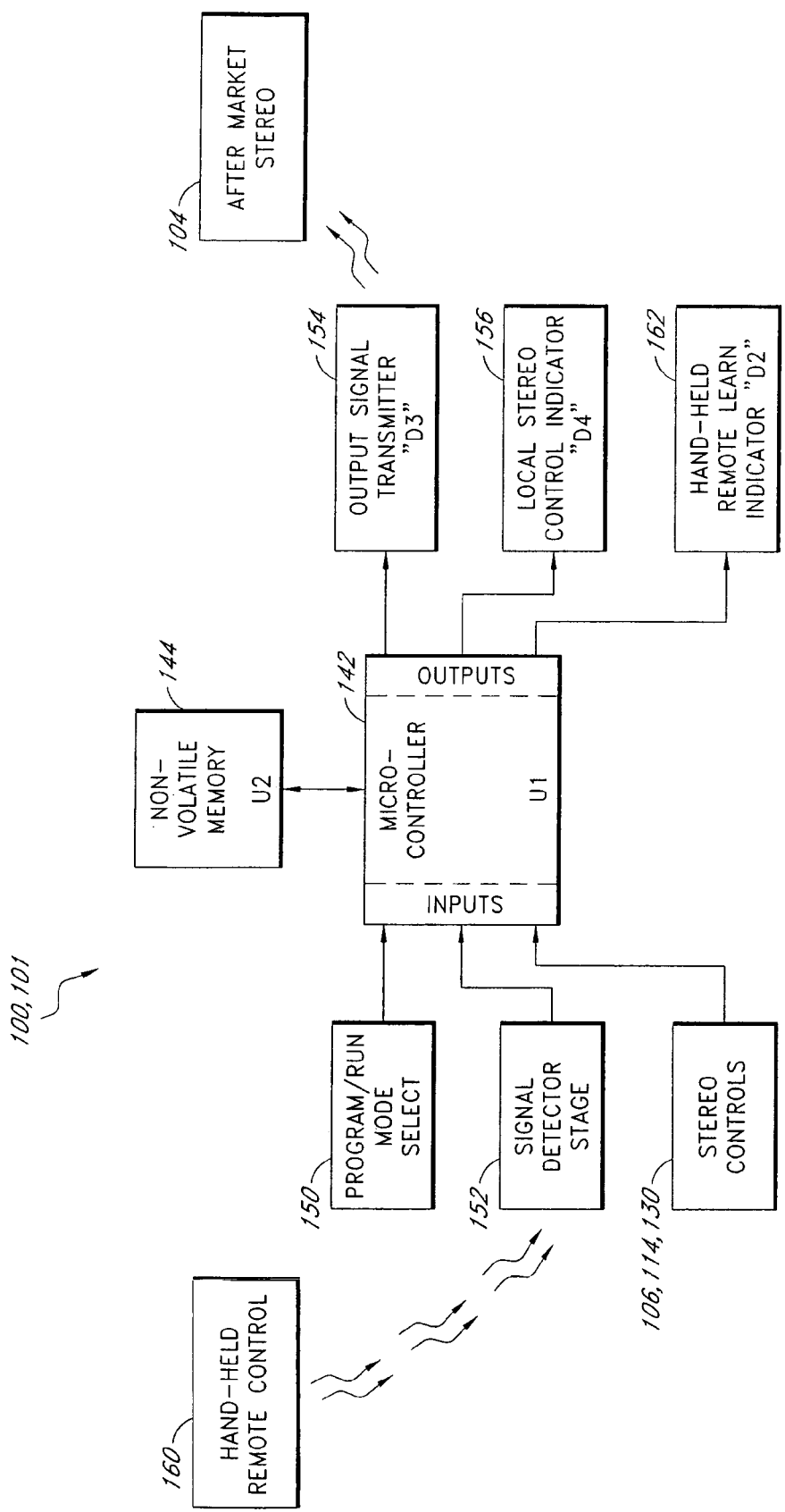
FIG. 3 is a schematic block diagram illustrating the basic configuration of the remote stereo control interface device of FIGS. 1 and 2.

FIG. 3 is a block diagram of the remote stereo control interface system 100 or 101 of the preferred embodiment. The remote stereo control interface system 100 or 101 incorporates a microcontroller 142 that is adapted to receive electrical signals from various switches, sensors and controls located in the vehicle for the purpose of controlling the replacement in-dash stereo 104. In particular the microcontroller 142 is adapted to receive a plurality of electrical signals from stereo controls, such as either the local stereo controls 106 or the alternative local stereo controls 114 of FIG. 1, or the handlebar stereo controls 130 of FIGS. 2A and 2B. The microcontroller 142 is also adapted to receive a signal from a detector stage 152 from the handheld remote control 160. As is well understood in the art, the detector stage 152 is adapted to receive and demodulate a wireless signal sent by a handheld remote control 160 for the in-dash stereo 104. As discussed above, the in-dash stereo 104 is preferably adapted to receive IR signals from a handheld remote control 160. As will be described in greater detail below, the microcontroller 142 is preferably adapted to be able to receive, from the handheld remote control 160, the wireless signal for controlling a particular stereo function, store this signal and then reproduce and broadcast this signal to the after-market in-dash stereo 104 when a driver or passenger in the vehicle activates a stereo control 106, 114 or 130 corresponding to the function of the stored signal.

The microcontroller 142, in this embodiment, also receives a signal from a program mode select switch 150, comprising switch S1 that is attached to the casing 111 of the remote interface circuit 110. The program mode select switch 150 when selected, instructs the microcontroller 142 to enter a program mode, allowing the microcontroller 142 to learn and record the specific control functions selected on the stereo controls 106, 114, 130 and the handheld remote control 160. These signals are stored in non-volatile memory 144 located on-board the remote interface circuit 110. It will be appreciated that the pre-selected specific control functions selected on the stereo controls 106, 114, 130 and the handheld remote control 160 will not be lost upon the removal of vehicle power when the ignition is switched off to the remote interface circuit 110 and the microcontroller 142. The microcontroller 142, when not in a program mode, may be in a run mode or an off state. A flowchart of the program mode and run mode shall be discussed in reference to FIGS. 5A and 5B below.

The microcontroller 142 is also adapted to output electrical signals to various output and display devices. In particular, the microcontroller 142 communicates data and instructions to the stereo receiver 104 via an output signal transmitter 154 located at the tip of the transmission cable 112. During the run mode of operation, the output signal transmitter 154 in combination with the microcontroller 142 generates a carrier signal with modulated data and instruction information, wherein this information is transmitted to the after-market stereo receiver 104 for the purpose of wireless stereo function selection and modification.

Other output devices attached to the microcontroller 142 include a local stereo control indicator 156 and a handheld remote learn indicator 162. The local stereo control indicator 156, in this embodiment, is a light emitting diode (LED) and provides the programmer a visual indication of the status of the programmability of each stereo control 106, 114, 130 function in the manner that will be described in greater detail hereinbelow. Furthermore, the handheld remote learn indicator 162 is controlled by the microcontroller 142 and provides the programmer a visual indication of the status of the programmability of each corresponding handheld remote instruction transmitted by the handheld remote control 160. The function of the indicators 156, 162 will be described in greater detail in reference to FIGS. 5A and 5B hereinbelow.

Figure 4A:
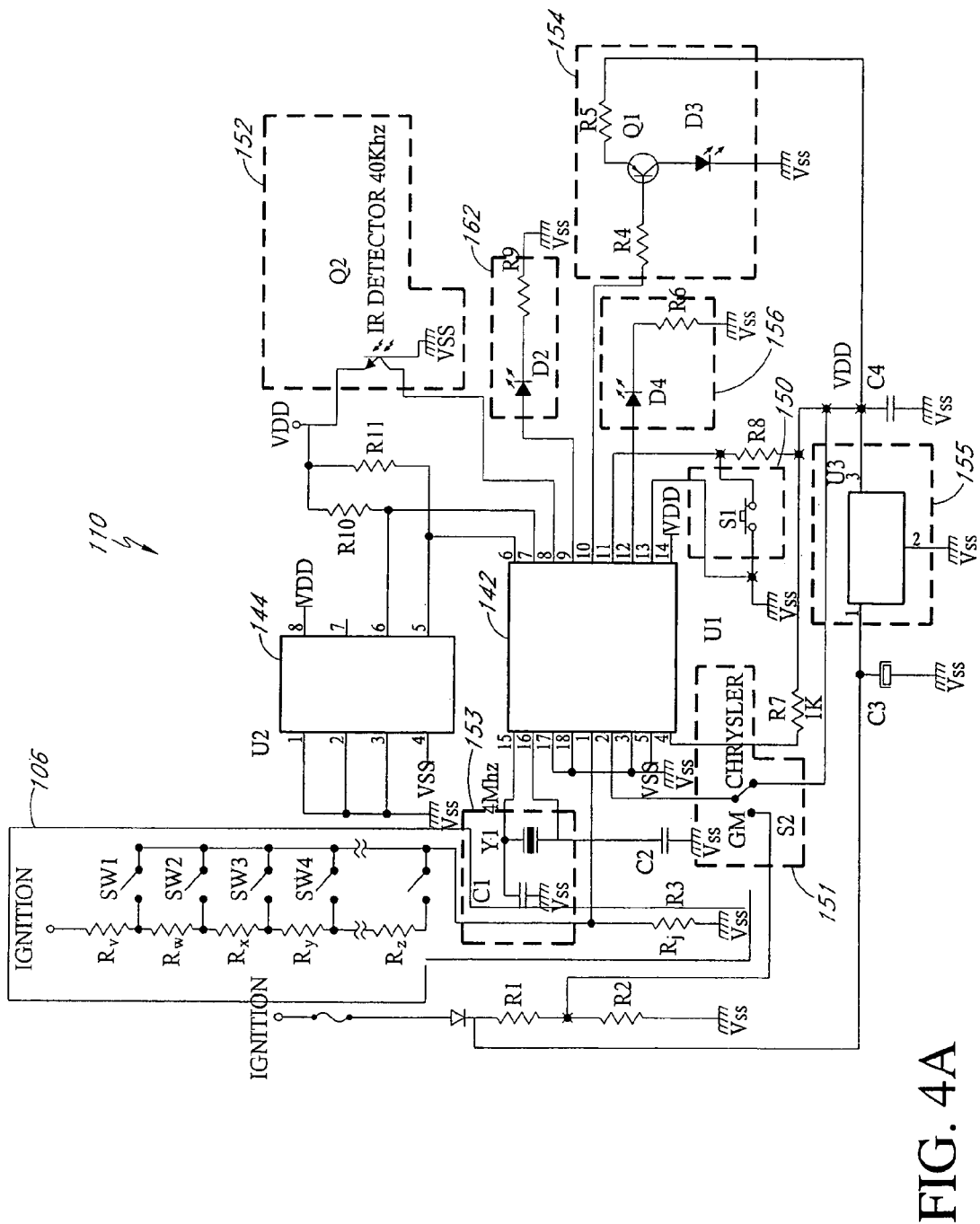
FIG. 4A is a schematic electrical diagram of the circuitry of one embodiment of the remote stereo control interface device.

FIG. 4A is a schematic circuit diagram of the remote interface circuit 110, wherein the remote interface circuit 110 is comprised of the microcontroller 142, comprising integrated circuit U1, the non-volatile memory 144, comprising integrated circuit U2, a plurality of inputs to the microcontroller 142 and outputs from the microcontroller 142. In particular, in this embodiment, the local stereo controls 106 form a voltage divider network that connects to the vehicle ignition voltage source with respect to reference voltage $V_{ss}$. As a local stereo control 106 is selected, the corresponding resistive network is 'placed' in the circuit and the voltage drop across this resistive element is applied to an analog-to-digital input port of the microcontroller 142. The resistive network of the local stereo controls 106 is comprised of a plurality of resistors (Rv, Rw, Rx, Ry, etc.) in a series configuration along with a plurality of corresponding switches (Sw1, Sw2, Sw3, Sw4, etc.). One side of each of the switches (Sw1, Sw2, Sw3, Sw4, etc.) is connected together and in a series configuration with resistor Rj (R3) which is located on-board the remote interface circuit 110.

In operation, the local stereo controls 106 operate as follows. When the user manipulates one of the local stereo controls 106 thereby activating one of the switches Sw1–Sw4, etc., the vehicle ignition voltage source is dropped by the corresponding resistor Rv–Rz, etc. so that a particular voltage signal is produced. This particular voltage signal can then be provided to the original stereo which is programmed to recognize the particular voltage signal as corresponding to a signal to implement a particular stereo function. For example, depressing switch Sw1 may instruct the factory stereo to increase the volume by a particular amount or it may instruct the stereo to change the radio channel to a different preset station.

In the implementation shown in FIG. 4A, the voltage signal from the local stereo controls 106 is provided to the microcontroller 142. As will be described in greater detail below, the microcontroller 142 is preferably configured to receive a particular voltage signal and then produce a corresponding wireless signal that will result in the replacement in-dash stereo 104 changing function in the same manner that the factory installed stereo would change function in response to receiving the same voltage signal. In particular, in one embodiment, the remote interface circuit 110 is designed to produce IR signals that correspond to the signals received from the stereo controls 106, 114 or 130.

As illustrated in FIG. 4A, in this implementation, a plurality of different voltage signals are sent to the microcontroller 142 in response to the user activating the plurality of different switches Sw1–Sw4. The voltage from the switches Sw1–Sw4 is preferably provided to an analog-to-digital converter (A-to-D). In one embodiment, the microcontroller 142 is programmable and the converted digital signal from the switches Sw1–Sw4 can be stored in the non-volatile memory 144 such that when the microcontroller 142 receives this signal, the stored digital signal can be referenced to produce a corresponding wireless signal in the manner that will be described in greater detail below.

In the illustrated embodiment, a GM-Chrysler selector switch 151, comprising switch S2 is also located on-board the remote interface circuit 110. In particular, the remote interface circuit 110 incorporates the GM-Chrysler selector switch 151 such that when placed in the GM position allows for a voltage drop produced across R2 to be fed to another A-to-D input port of the microcontroller 142. As with the voltage divider networks configured within the local stereo controls 106, the series combination of resistor R1 and R2 also form a voltage divider network with a tap formed at the node of R1 and R2 and the vehicle ignition again serving as a voltage excitation source. The sampled voltage by the microcontroller 142 at this R1 and R2 node forms a reference voltage level against which the same ignition voltage excites the network formed by the local stereo controls 106 and produces selected output voltages. A software algorithm that runs in the microcontroller 142 measures these voltages and provides compensation for voltage fluctuations that occur on the vehicle ignition when the vehicle is a General Motors product. Moreover, when the GM-Chrysler selector switch 151 is placed in the Chrysler position, the reference voltage now becomes VDD (+5VDC) shown in FIG. 4A at output pin 3 of voltage regulator U3. Chrysler vehicles currently use a regulated +5 VDC supply that does not change with ignition voltage conditions.

Hence, in this embodiment, the remote interface circuit 110 is configurable so as to be adapted for more than one different make or model of vehicle. It will be appreciated that the electrical systems of different makes and models of vehicles vary from vehicle to vehicle. In this particular embodiment, the remote interface circuit 110 can be made as universal as possible such that a single device can be configured to be used with many different types of vehicles.

As is also illustrated in FIG. 4A, the microcontroller also receives an input signal from the IR detector stage 152, wherein the detector stage 152 is formed by the transistor Q2. The transistor Q2 is an IR detector device adapted to accept modulated commands and data from the handheld remote control 160 that is provided with the after-market replacement stereo receiver 104. As discussed above, the after-market stereo receiver 104 is preferably adapted to receive wireless signals from the handheld remote control 160 to control stereo function. In this embodiment, the remote interface circuit 110 is adapted to be able to receive and store the wireless signals from the handheld remote control 160 so that the remote interface circuit 110 can be programmed to reproduce a wireless signal corresponding to the signal produced by a local stereo control 106.

In this embodiment, the remote interface circuit 110 receives a modulated carrier signal from the handheld remote control 160 that is then provided to the microcontroller 142. In particular, the modulated carrier signal is provided by the detector stage 152 to a bi-directional input-output port of the microcontroller 142. Subsequently, the data pattern received by the microcontroller 142 from the detector stage 152 is stored in the non-volatile memory 144 via a serial data transfer link from the microcontroller 142 that has pull-up resistors R7, R8, R10 and R11. As will be described in greater detail below, this stored data pattern can be retrieved at a later time for use in the run mode such that the remote interface circuit 110 can reproduce the wireless signal produced by the handheld remote control 160 to change a stereo function in response to receiving a corresponding command from the local stereo controls 106.

In this embodiment, the microcontroller 142 receives several other inputs including inputs from a program mode switch 150. The program mode switch 150 is mounted on the PC board and extends through the casing 111 such that a programmer can depress the switch and place the microcontroller 142 in a program mode whereby the microcontroller 142 can be programmed in the manner described below in conjunction with FIG. 5A.

The remote interface circuit 110 also includes several output devices including a local stereo control indicator 156 comprised of an LED D4 that is mounted on the PC board and is visible through the casing 111 and series connected to $V_{ss}$ via resistor R6. The microcontroller 142 is adapted to provide a visual indication, via the local stereo control indicator 156, to the programmer when the microcontroller 142 has received a signal from the local stereo controls 106.

Similarly, the interface circuit 110 also includes a handheld remote learn indicator 162 that is comprised of an LED D2 in series with a current limiting resistor R9 connected to the microcontroller 142. The handheld remote learn indicator 162 is preferably mounted to the casing 111 so as to be visible by the programmer and the microcontroller 142 is programmed so as to be able to provide a visual indication to the programmer when the microcontroller 142 has received a signal from the handheld remote control 160.

The remote interface circuit 110 also includes the output signal transmitter 154 which is comprised of an IR LED D3, a driver transistor Q1, a series base current limiting resistor R4, a current limiting resistor R5 and the output switching port at pin 10 of the microcontroller 142. The IR LED D3 is capable of reproducing the wireless signals previously stored in the memory 144. The output signal transmitter 154 receives these signals via the transmission cable 112 so that the wireless signals can be transmitted to the replacement in-dash stereo 104 in a manner that will be described in greater detail in conjunction with FIGS. 5A and 5B.

FIG. 4A also illustrates a crystal controlled clock 153 comprised of a 4 MHz crystal Y1 in parallel with capacitors C2 and C1 to form an oscillator and which provides a clocking signal to the microcontroller 142. Moreover, the remote interface circuit 110 also includes a voltage regulator circuit 155 that is comprised of a voltage regulator U3, an output filter capacitor C4, and an input filter capacitor C3. The voltage regulator U3 provides a steady state +5vdc output which is adapted to supply the excitation voltage for the non-volatile memory 144, the microcontroller 142, the detector stage 152, and the output signal transmitter 154.

FIG. 4A illustrates one particular implementation of the remote interface circuit 110. As illustrated, the remote interface circuit 110 receives signals from local stereo control devices, such as steering wheel buttons or switches, passenger switches, handlebar switches and the like, and then translates these signals into signals that are recognizable by the replacement in-dash stereo 104. In this particular implementation, the interface circuit 110 provides corresponding wireless signals, such as IR signals, to the replacement in-dash stereo 104 upon receipt of corresponding input signals from the local stereo controls 106. It will be appreciated that the exact configuration of the remote interface circuit 110 can vary depending upon the configuration of the vehicle and the replacement stereo receiver 104 without departing from the present invention. For example, FIGS. 4B and 4C illustrate several other manners in which local stereo controls 106 are implemented in different types of vehicles.

Figure 4B:
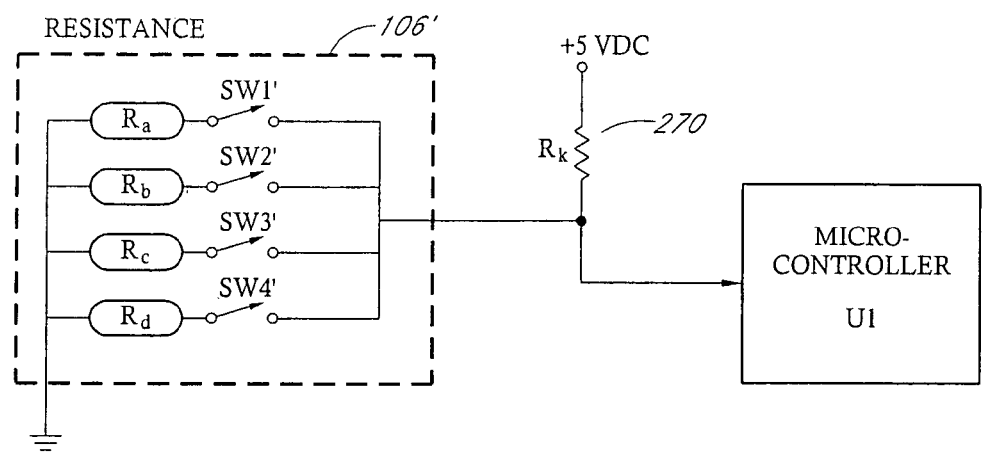
FIGS. 4B and 4C are partial schematic illustrations illustrating alternative configurations of local stereo controls.

FIG. 4B illustrates an alternative configuration of a local stereo control 106', which uses a resistor ladder configuration such that each switch closure selection on the local stereo control 106' connects a different value resistor to the vehicle ground. In particular, if switch Sw1 is depressed on the local stereo control 106', then resistor Ra will be placed in series with fixed resistor Rk and +5vdc will provide the excitation voltage across the combined resistance of (Ra+Rk) producing a specific voltage drop across Ra. This specific voltage drop across Ra is fed to an A-to-D input port of the microcontroller 142 that corresponds to the selected switch function Sw1. Moreover, sequential switch selections by Sw1, Sw2, Sw3, etc. create specific voltage drops that are sampled by the microcontroller 142 and are used in both the program mode and the run mode in the previously described manner.

Figure 4C:
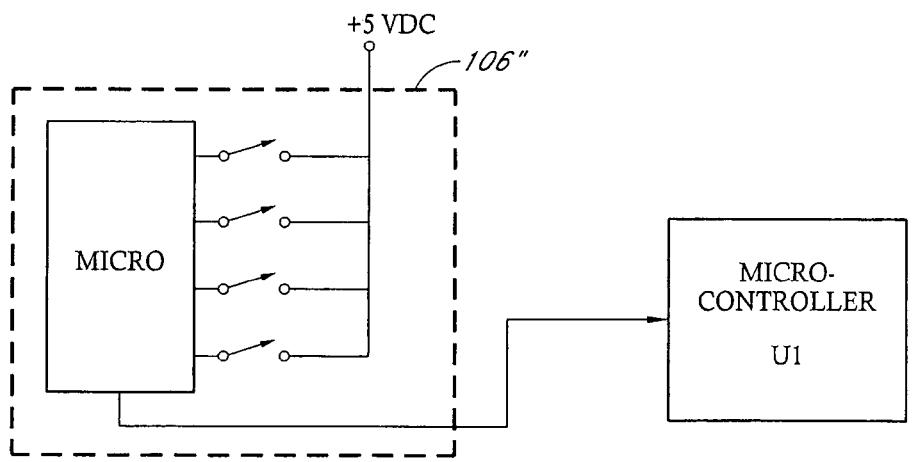

Similarly, FIG. 4C illustrates another embodiment of a local stereo control 106" used by a number of automobile manufacturers. In particular, this embodiment is shown with a microprocessor and a plurality of switches, wherein each switch closure on the local stereo control 106" generates a unique serial data command that is adapted to be accepted by the microcontroller 142 via a digital input port.

FIG. 5A is a flowchart which illustrates a program mode 210 of operation of one embodiment of the remote interface circuit 110 wherein a programmer programs the remote interface circuit 110 to send appropriate wireless signals to an after-market in-dash stereo 104 in response to receiving signals from local stereo controls 106. Advantageously, the remote interface circuit 110 can be programmed by the programmer using the vehicle's local stereo controls 106 and the handheld remote control 160. The programmer simply manipulates a particular stereo control 106, 114, 130 and then depresses a corresponding button on the handheld remote control 160 to program the remote interface circuit 110 so that the remote interface circuit 110 can send the appropriate wireless signal to the replacement in-dash stereo 104.

Figure 5B:
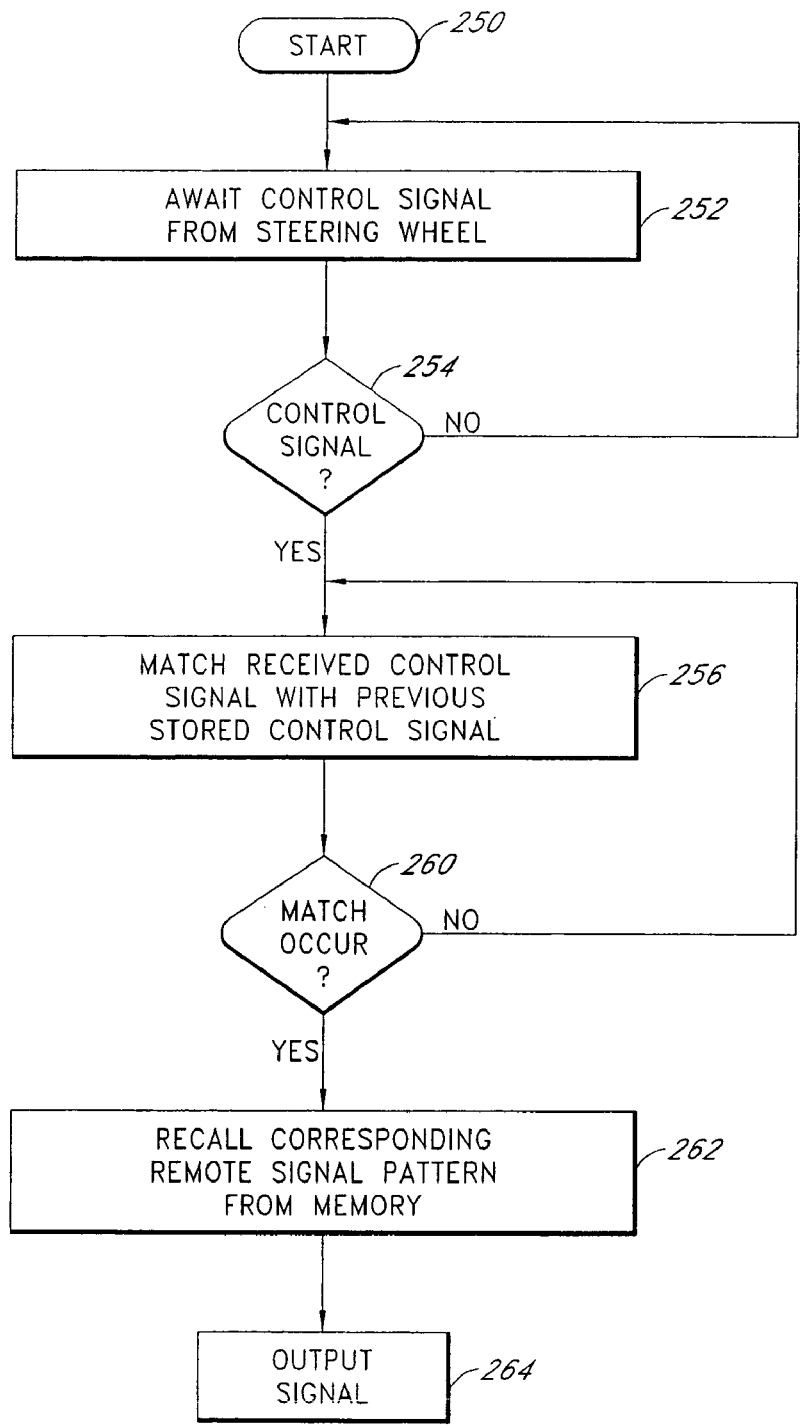
FIG. 5B is an exemplary flow chart illustrating the operation of the microcontroller of the remote stereo control interface device in a run mode.

In particular, as shown in FIG. 5A, the microcontroller 142, from a start state 200, checks the configuration of the microcontroller 142 ports in state 202 and determines, in decision state 204, whether the program mode switch 150 located on the casing 111 of the remote interface circuit 110 has been selected. If the microcontroller 142 determines, in decision state 204, that the program mode switch 150 has not been selected, the microcontroller 142 then enters a run mode 206, wherein the microcontroller 142 is in an operational state that will be described in greater detail in reference to FIG. 5B.

If the microcontroller 142 has determined, in decision state 204, that the program mode switch 150 was selected, the microcontroller 142 enters the program mode 210 and performs a visual indication, in state 210, that the microcontroller 142 is awaiting a control signal from the local stereo controls 106. In this embodiment, the microcontroller 142 illuminates the local stereo control indicator 156 located on the casing 111 of the remote interface circuit 110.

The microcontroller 142 waits to receive a signal from the local stereo controls 106 in state 212. In particular, the programmer selects one of the stereo controls 106, 114, 130 and this results in a stereo control signal being provided to the microcontroller 142 in the manner described above. The microcontroller 142 then ascertains, in decision state 214, whether the local stereo control signal has been received. If the microcontroller 142 determines that a local stereo control input has been received, the microcontroller 142 stores the local control signal in the non-volatile memory 144 in state 216. The microcontroller 142 also provides a visual indication of acknowledgement to the programmer that the control signal was received in state 220, wherein the light emitting diode D4 of the local stereo control indicator 156 is activated.

The microcontroller 142 then provides, in state 222, a visual indication to the programmer that the microcontroller 142 is awaiting a remote signal from the handheld remote control 160. The visual indication to the programmer is provided by the handheld remote learn indicator 162, wherein the light emitting diode D2 located on-board the remote interface circuit 110 is turned on. The microcontroller 142 then awaits a signal from the handheld remote control 160 in state 224. The signal from the handheld remote control 160 is produced in response to the programmer depressing a button that has the same function as the stereo control 106, 114 or 130 previously activated by the programmer and detected by the microcontroller 142 in state 212. The signal is provided by the handheld remote control 160 to the microcontroller 142 via the signal detector stage 152 in the previously described manner.

The microcontroller 142 continues to await the signal from the handheld remote control 160 until the microcontroller 142 determines, in decision state 226, that such a signal has been received. Once the remote control signal is received, the microcontroller 142 stores the received remote control signal pattern to non-volatile memory 144, in storage state 230, and preferably, in association state 232, associates the wireless remote signal pattern to the corresponding control input defined in state 216. In this embodiment, the association or mapping is done by storing the signal corresponding to the received wireless signal from the handheld remote control 160 in a data location in the non-volatile memory 144 adjacent the data location for the corresponding local stereo control signal. Hence, for each local stereo control signal, a corresponding handheld remote control signal can be stored in the non-volatile memory 144 such that subsequent activation of the stereo controls 106, 114, 130 will enable the microcontroller 142 to recall the corresponding wireless signal from the non-volatile memory 144 and produce the corresponding wireless signal via the output signal transmitter 154 in a manner that will be described in greater detail below.

Upon the completion of the association state 232, the microcontroller 142 determines, in decision state 234, whether the programming has been completed. If the programming has not been completed the microcontroller 142 returns to a state 210 where the microcontroller 142 awaits the next stereo control 106, 114, 130 signal. In this way, the programmer can continue programming the remote interface circuit 110 to store input signals from the local stereo controls 106 mounted within the vehicle and also store and map corresponding input signals from the handheld remote control 160 that is used to control the replacement stereo. If the programming has been completed, the microcontroller 142 enters a run mode 206.

FIG. 5B is a flow chart which illustrates the operation of the remote interface circuit 110 in a run mode 206 wherein the remote interface circuit 110 can receive signals from any of the stereo controls 106, 114, 130 and then provide corresponding output signals that are recognizable by the replacement in-dash stereo 104. In particular, the microprocessor 142, from a start state 250, awaits a control signal from the stereo controls 106, 114, 130 in state 252. As discussed above, the stereo controls 106, 114, 130 can be comprised of the local stereo controls 106 or the alternate stereo controls 114 or both, illustrated in FIG. 1, the handlebar stereo controls 130 from a motorcycle 116, illustrated in FIGS. 2A and 2B, or any other control that is remotely located from the face of the in-dash stereo 104.

Upon the microprocessor 142 determining, in decision state 254, that a local control signal has been received from the local stereo control 106, the microcontroller 142 then matches, in state 256, the received local control signal with a previously stored output signal in the memory 144. As discussed above in connection with the description of the program mode 210 of the microcontroller 142 in FIG. 5A, by sequentially programming each of the stereo controls 106, 114, 130 with the corresponding button on the handheld remote control 160, the microcontroller 142 is able to map these two signals such that the microprocessor 142 is capable of recalling the corresponding output signal from the non-volatile memory 144. In other words, the microcontroller 142, upon receipt of the input signal from the local stereo control 106, recalls, from the memory 144, a digital signal that can then be used to generate an appropriate output signal via the output signal transmitter 154 that will be recognizable by the replacement in-dash stereo 104.

The microcontroller 142 then determines, in decision state 260, whether a match has occurred and, if a match has occurred, the microcontroller then recalls the corresponding remote signal pattern from the memory 144, in state 262, and then outputs the appropriate IR signal via the output signal transmitter 154, in state 264. As discussed above, the replacement in-dash stereo 104 is preferably adapted to receive signals, such as wireless signals, including I/R signals, from the handheld remote control 160. Preferably, the microcontroller 142 is programmed such that it is capable of reproducing the same wireless signal that would be provided by the handheld remote control 160.

Hence, the user can program the remote interface circuit 110 such that controls, such as increase or decrease volume, change channels and the like, on the steering wheel 102 or some other remote location within the vehicle can be used to generate corresponding wireless signals from the remote interface circuit 110. The remote interface circuit 110 thereby allows factory installed vehicle remote controls for a factory stereo to continue to be used with a replacement stereo receiver. This greatly increases the flexibility for individuals wishing to replace their factory stereos as it does not eliminate the utility of the remote vehicle controls.

Figure 6:
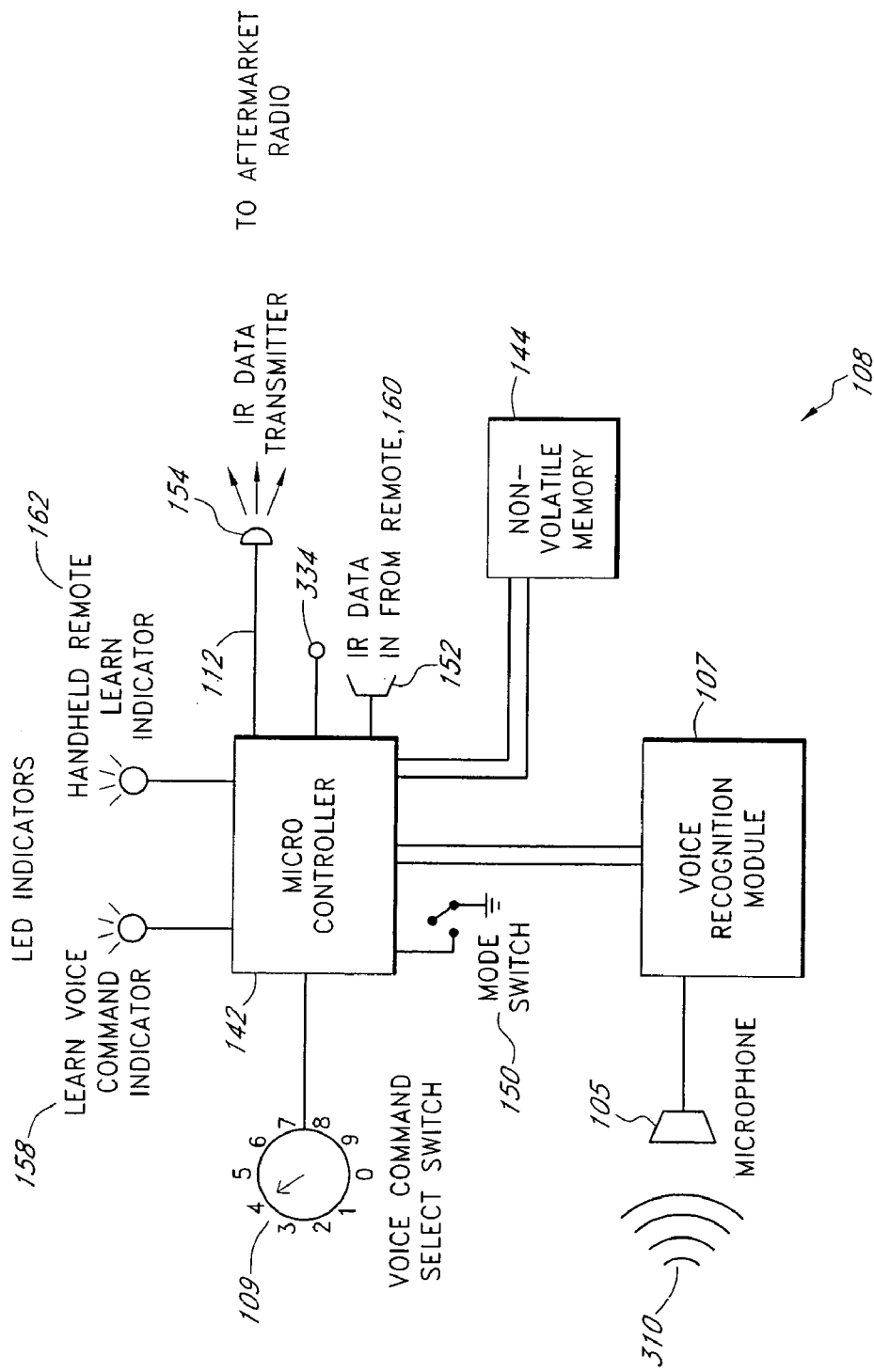
FIG. 6 is a block diagram showing the configuration of a voice control interface to enable voice commands to control a stereo or other parts of a motor vehicle.

FIG. 6 illustrates another embodiment of the present invention in which a voice control interface 108 is adapted to respond to spoken voice commands 310 and transmit corresponding signals to an aftermarket in-dash stereo 104. The voice commands 310 are spoken words or phrases that a user desires to use to control features of a motor vehicle, such as a stereo control unit or receiver. The voice control interface 108 functions in a similar manner to that previously described for the remote control stereo interface system 100 with local stereo controls 106 except that the inputs to the voice control interface 108 are spoken voice commands 310 rather than the manipulation of local stereo controls 106. Otherwise the components, functions, and features of the voice control interface 108 are substantially similar to those previously described for the remote control stereo interface 100.

The voice control interface 108 comprises a microphone assembly 105 and a voice recognition module 107. The microphone assembly 105 is adapted to transduce voice commands 310 in the normal range of human hearing from approximately 20 Hz to 20 kHz and send a corresponding analog electrical signal along an attached cable in a manner well known in the art. The microphone assembly 105 is a commonly available industry standard miniature microphone. A first end of the microphone assembly 105 is connected to an input of the voice recognition module 107. A second end of the microphone assembly 105 is placed adjacent the driver or passenger so as to readily pick up voice commands 310. The microphone assembly 105 is preferably placed behind the dashboard 103 or in another location so as to be unobtrusive to the driver or passengers.

The voice control interface 108 also comprises a voice recognition module 107. The voice recognition module 107 is preferably a speaker-dependent commercially available item such as the type HM2007 available from Images Company of Staten Island, N.Y. or the Voice Direct™ 364 available from Sensory, Inc. of Sunnyvale, Calif. The voice recognition module 107 is provided with on-board memory to store digitized sound patterns. The voice recognition module 107 is provided with inputs adapted to receive analog electrical signals from the microphone assembly 105. The voice recognition module 107 includes an analog-to-digital converter (A-to-D). The A-to-D continuously converts the analog signals received from the microphone assembly 105 to digital equivalents. The voice recognition module 107 continuously compares the digitized audio patterns to stored voice command 310 patterns. When the voice recognition module 107 recognizes a match with a stored voice command 310, the voice recognition module 107 sends a serial digital signal corresponding to the stored voice command 310 to a microcontroller 142 via the outputs of the voice recognition module 107 in a manner well known in the art.

The voice control interface 108 also comprises a microcontroller 142. The microcontroller 142 is adapted to receive electrical signals from the voice recognition module 107 and the microphone 105 for the purpose of controlling the replacement in-dash stereo 104. The microcontroller 142 is also adapted to receive a signal from a detector stage 152 from a handheld remote control 160. As is well understood in the art, the detector stage 152 is adapted to receive and demodulate a wireless signal sent by a handheld remote control 160 for the in-dash stereo 104. As will be described in greater detail below, the microcontroller 142 is preferably adapted to be able to receive, from the handheld remote control 160, the wireless signal for controlling a particular stereo function, store this signal and then reproduce and broadcast this signal to the after-market in-dash stereo 104 when a voice command 310 is spoken corresponding to the function of the stored signal.

The voice control interface 108 also comprises non-volatile memory 144. The non-volatile memory 144 is adapted to store digital messages corresponding to the IR patterns sent by the handheld remote control 160 and be able to provide these messages to the microcontroller 142 as needed in the manner previously described.

The voice control interface 108 also comprises a transmission cable 112. In this embodiment, the transmission cable 112 includes an output signal transmitter 154 that is located in line of sight of a remote signal receiver (not shown) on the after-market in-dash stereo 104. The transmission cable 112 is generally 4 feet in length and is positioned in the vehicle dashboard 103 such that the tip of the transmission cable 112 that is comprised of the output signal transmitter 154 is positioned generally within close proximity of the in-dash stereo 104. The transmission cable 112 is connected to the microprocessor 142 and the transmission cable 112 and attached output signal transmitter 154 are adapted to transmit wireless IR signals that the microcontroller 142 has retrieved from the non-volatile memory 144 and which correspond to control signals sent by the handheld remote control 160.

The voice control interface 108 also comprises a voice command select switch 109. The voice command select switch 109 in this embodiment is a ten position rotary switch of a type well known in the art. The voice command select switch 109 is connected to the microcontroller 142 and allows the voice control interface 108 to learn up to ten different voice commands 310 in a manner that will be described in greater detail below.

The voice control interface 108 also comprises a learn voice command indicator 158 and a handheld remote learn indicator 162. The learn voice command indicator 158 and handheld remote learn indicator 162 are light emitting diodes (LED's) and provide the user a visual indication of the status of the programmability of voice commands 310 in a manner that will be described in greater detail below.

The voice control interface 108 also comprises a program mode select switch 150. The program mode select switch 150, when selected, instructs the microcontroller 142 to enter a program mode, allowing the microcontroller 142 to learn and record the specific voice commands 310 and IR command signals from the handheld remote control 160 in a manner that will be described in greater detail below.

It can be appreciated that the voice control interface 108 can be readily adapted to function with the local stereo controls 106 previously described in conjunction with the voice commands 310 herein described. The voice control interface 108 can also be readily provided with auxiliary outputs 334 adapted to control other features of a motor vehicle such as raising and lowering windows, locking or unlocking doors, moving seats, switching on headlights, etc. The auxiliary outputs 334 can be adapted to control the features of the vehicle directly or can operate relays and the like in a manner well understood by those skilled in the art.

Figure 7:
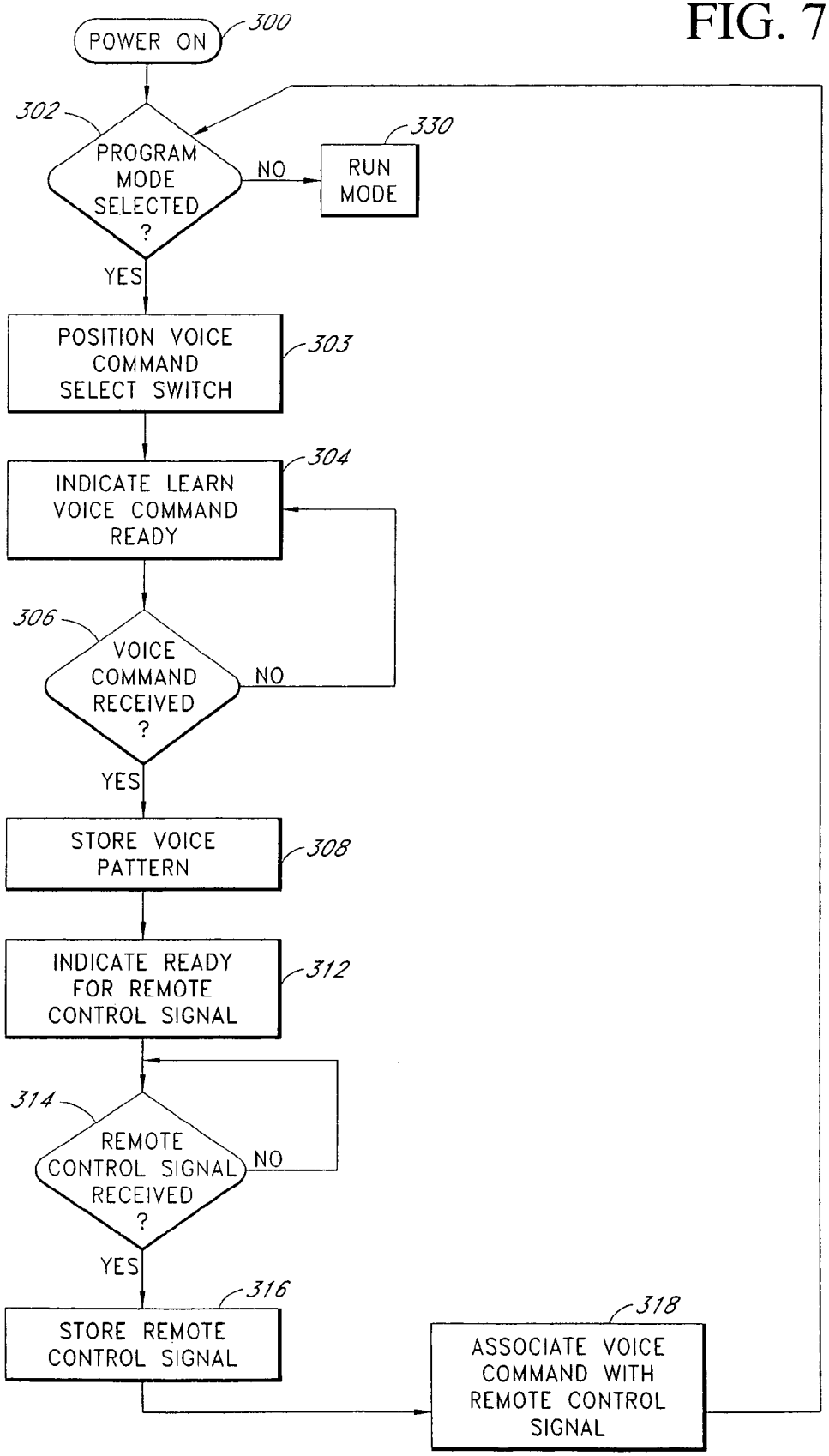
FIG. 7 is a flow chart depicting the operation of the voice control interface in the program mode of operation.

FIG. 7 shows the operation of the voice control interface 108 in a program mode 320. From a power on 300 state, the voice control interface 108 determines the position of the program mode select switch 150 in a decision state 302. If the voice control interface 108 determines, in the decision state 302, that the program mode select switch 150 is in the program position, the voice control interface 108 enters the program mode 320. The user then positions the voice command select switch 109 to the desired position, in a state 303. The voice command select switch 109 allows the user to select and program up to ten different voice commands 310.

The voice control interface 108 provides an indication, in state 304, that the voice control interface 108 is ready to receive and program a voice command 310. The indication in state 304 is provided by the learn voice command indicator 158 illuminating. While the voice control interface 108 is indicating, in state 304, that the voice control interface 108 is ready to receive and program a voice command 310, the voice control interface 108 determines, in decision state 306, whether a voice command 310 has been received by the voice control interface 108. Once the user speaks a voice command 310, the voice recognition module 107 digitizes and stores the sound pattern of the voice command 310 in the on-board memory location corresponding to the voice command 310 selected by the voice command select switch 109 in a storage state 308.

The voice control interface 108 then provides, in state 312, a visual indication to the programmer that the voice control interface 108 is awaiting a signal from the handheld remote control 160. The visual indication to the programmer is provided by the handheld remote learn indicator 162, wherein the light emitting diode D2 is turned on. The voice control interface 108 then awaits a signal from the handheld remote control 160, in state 312. The signal from the handheld remote control 160 is produced in response to the programmer depressing a button that has the same function as the voice command 310 previously spoken by the programmer and stored by the voice recognition module 107, in state 308. The signal is provided by the handheld remote control 160 to the voice control interface 108 via the signal detector stage 152 in the previously described manner.

The voice control interface 108 awaits a signal from the handheld remote control 160 until the voice control interface 108 determines, in decision state 314, that such a signal has been received. Once the remote control signal is received, the voice control interface 108 stores the received remote control signal pattern to non-volatile memory 144, in storage state 316, and preferably, in association state 318, associates the wireless remote signal pattern to the corresponding voice command 310 defined in state 308. In this embodiment, the association or mapping is done by storing the signal corresponding to the received wireless signal from the handheld remote control 160 in a data location in the non-volatile memory 144 adjacent the data location for the corresponding voice command 310. Hence, for each voice command 310, a corresponding handheld remote control signal can be stored in the non-volatile memory 144 such that subsequent speaking of the voice command 310 will enable the microcontroller 142 to recall the corresponding wireless signal from the non-volatile memory 144 and produce the corresponding wireless signal via the output signal transmitter 154 in the manner previously described.

Upon the completion of the association state 318, the voice control interface 108 determines, in decision state 302, whether the program mode 320 is still selected. If the programming has not been completed the voice control interface 108 returns to state 303 where the user selects the next voice command 310 via the voice command select switch 109 and the voice control interface 108 awaits the next voice command 310. In this way, the programmer can continue programming the voice control interface 108 to store additional voice commands 310 and also store and map corresponding input signals from the handheld remote control 160. The voice control interface 108 provides the ability to write over programmed voice commands 310 thereby allowing the user to change the voice command 310 wording or to allow a subsequent user to reprogram the voice control interface 108 to recognize their voice patterns. If the programming has been completed, the voice control interface 108 enters a run mode 330.

Figure 8:
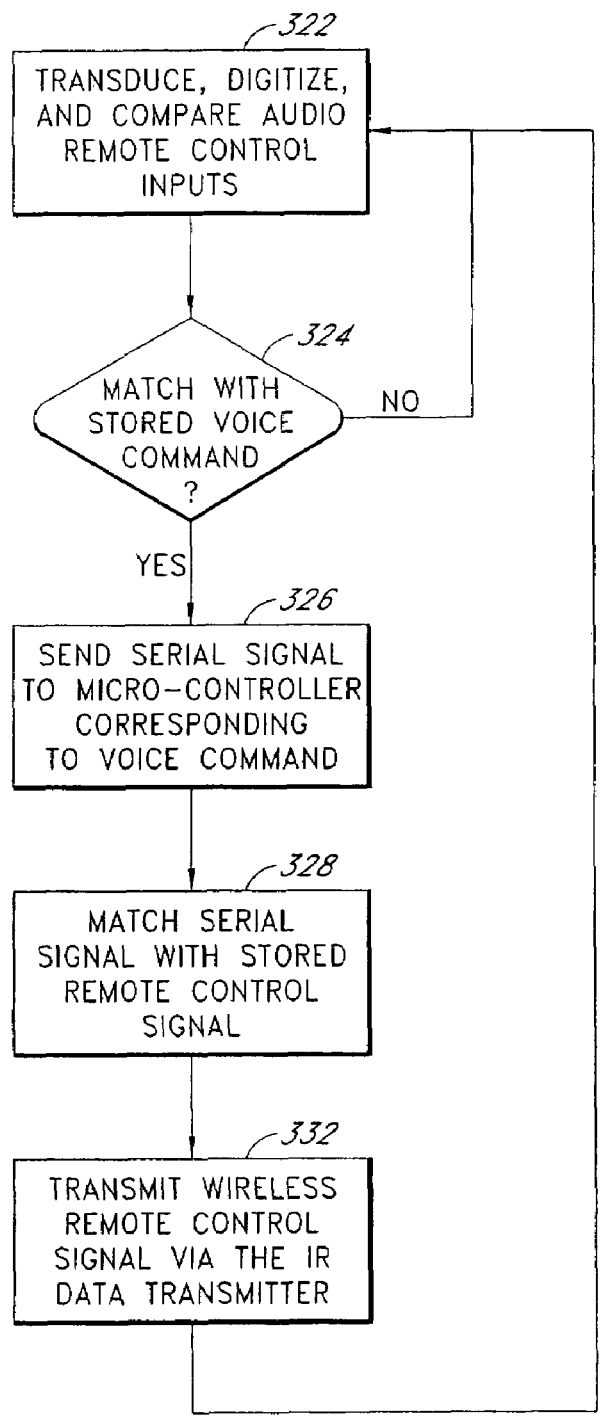
FIG. 8 is a flow chart depicting the operation of the voice control interface in the run mode of operation.

FIG. 8 illustrates the operation of the voice control interface 108 in the run mode 330. The voice control interface 108 and, in particular, the voice recognition module 107 is adapted to continuously monitor audio input via the microphone assembly 105, in state 322. The voice recognition module 107 is capable of continuous listening wherein the voice recognition module 107 digitizes the audio input from the microphone assembly 105 and compares, in a known manner, the digitized sound patterns to those stored in on-board memory as voice commands 310 in the program mode 320. When the voice recognition module 107 recognizes a match, in decision state 324, the voice recognition module 107 sends a serial signal to the microcontroller 142 corresponding to the recognized voice command 310 in state 326.

In state 328, the microcontroller 142 matches the received serial signal for a voice command 310 with the corresponding remote control signal previously stored in non-volatile memory 144 in the program mode 320 in the manner previously described. The voice control interface 108 then sends the remote control signal to be transmitted via the output signal transmitter 154 in the manner previously described. The voice control interface 108 then returns to listening state 322.

It can be appreciated that the voice control interface 108 offers a program mode 320 wherein the user can program voice commands 310 as desired and enable the user to control a replacement in-dash stereo 104 with voice commands 310. The voice control interface 108 can write over the programmed voice commands 310 thereby allowing the user to change voice commands 310 or to allow subsequent users to program the voice control interface 108 for their own voice patterns. It can be appreciated that by using voice commands 310 the driver need not divert his attention away from the task of driving and can thereby change the operation of the stereo while still driving in a safe manner. The voice control interface 108 allows a user to retrofit convenient voice controls in an economical manner to a vehicle that did not originally come equipped with remote controls for the stereo.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A voice control interface device adapted to be installed in a vehicle as an aftermarket product hardwire connected to at least one or more local stereo control buttons that receives at least one voice command and at least one command from one or more local stereo control buttons positioned within the vehicle in a first format and produces at least one wireless output signal to a replacement aftermarket stereo receiving lacking voice command capability and installed in the vehicle to replace an originally installed stereo receiver so that either of the at least one voice command or the local stereo control button command can be used to control the operation of the replacement aftermarket stereo receiver, and wherein the one or more local stereo control buttons were originally installed in the vehicle to control the originally installed stereo receiver that was responsive to signals in the first format.

2. The device of claim 1, wherein the voice control interface device outputs at least one wireless signal to the replacement aftermarket stereo receiver corresponding to the at least one voice command or the local stereo control button command.

3. The device of claim 2, wherein the voice control interface device receives a first wireless signal from a handheld remote control upon a user depressing a first function key on the handheld remote control to change a first function of the operation of the replacement aftermarket stereo receiver and wherein the voice control interface produces a signal corresponding to the first wireless signal in response to a user speaking a first voice command or input of the one or more local stereo control button commands.

4. The device of claim 3, wherein the voice control interface device includes a memory and is programmable so as to store wireless signals corresponding to the at least one voice command and local stereo control button command such that subsequent speaking of the at least one voice command or input of the one or more local stereo control button commands results in the corresponding wireless signal being sent to the replacement aftermarket stereo receiver.

5. The device of claim 4, wherein the memory is rewritable and the voice control interface device further comprises a switching device to enable the user to selectively reprogram voice commands.

6. The device of claim 5, wherein the voice control interface device includes a wireless receiver and a wireless transmitter so that the voice control interface device can receive the first wireless signal from the handheld remote control and store a corresponding signal in the memory such that the voice control interface device can recall the stored signal and thereby generate a wireless signal corresponding to the first wireless signal so as to change the first function of the replacement aftermarket stereo receiver.

7. The device of claim 6, wherein the voice control interface device is further provided with outputs to control at least one operational aspect of the vehicle.

8. A stereo system for a vehicle comprising:
one or more local stereo control buttons originally mounted in a first location on the vehicle that is adapted to send local control signals in a first format to an original stereo receiver to control the operation of an original stereo receiver,
a replacement aftermarket stereo receiver lacking voice control capability and adapted to replace the original stereo receiver, wherein the replacement aftermarket stereo receiver is mounted in a first location on the vehicle and wherein the replacement aftermarket stereo receiver is adapted to receive wireless remote control signals to control the operation of the replacement aftermarket stereo receiver; and
an aftermarket interface device that is adapted to be positioned within the vehicle connected to the one or more local stereo control buttons so as to be able to receive voice commands and commands from the one or more local stereo control buttons in the first format and, in response to receiving the voice commands or commands in the first format, send output wireless control signals corresponding to the wireless remote control signals so as to control the operation of the replacement stereo such that either the voice commands or the local stereo control button commands can be used to control the replacement stereo via the interface device.

9. The system of claim 8, wherein the voice control interface device receives at least one command and outputs at least one wireless signal to the replacement aftermarket stereo receiver corresponding to the at least one command.

10. The system of claim 9, wherein the voice control interface device receives a first wireless signal from a handheld remote control upon a user depressing a first function key on the handheld remote control to change a first function of the operation of the replacement aftermarket stereo receiver and wherein the voice control interface produces a signal corresponding to the first wireless signal in response to a user speaking a first voice command or actuating a first local stereo control button.

11. The system of claim 10, wherein the voice control interface device includes a memory and is programmable so as to store wireless signals corresponding to the at least one command such that subsequent occurrence of the at least one command results in a corresponding wireless signal being sent to the replacement aftermarket stereo receiver.

12. The system of claim 11, wherein the memory is rewritable and the voice control interface device further comprises a switching device to enable the user to selectively reprogram voice commands.

13. The system of claim 12, wherein the voice control interface device includes a wireless receiver and a wireless transmitter so that the voice control interface device can receive the first wireless signal from the handheld remote control and store a corresponding signal in the memory such that the voice control interface device can recall the stored signal and thereby generate a wireless signal corresponding to the first wireless signal so as to change the first function of the replacement aftermarket stereo receiver.

14. The system of claim 9, wherein the voice control interface device is further provided with outputs to control at least one operational aspect of the vehicle.

15. A stereo system for a vehicle comprising:
one or more local stereo control buttons originally mounted in a first location on the vehicle that is adapted to send local control signals in a first format to an original stereo receiver to control the operation of an original stereo receiver,
a replacement aftermarket stereo receiver lacking voice command capability and adapted to replace the original stereo receiver, wherein the replacement aftermarket stereo receiver is mounted in a first location on the vehicle and wherein the replacement aftermarket stereo receiver is responsive to at least one wireless remote control signal such that upon receipt of the at least one wireless remote control signal, the replacement aftermarket stereo receiver alters the operation of the replacement aftermarket stereo receiver; and an aftermarket interface device, positioned within the vehicle and connected to the one or more local stereo control buttons that is responsive to at least one voice and one local stereo control button command signal from a person in the vehicle, wherein the aftermarket interface device wirelessly transmits a functional equivalent of the at least one wireless remote control signal to the replacement aftermarket stereo receiver upon receiving the at least one command signal.

16. The stereo system of claim 15, wherein the vehicle comprises a motorcycle and the at least one command signal comprises a signal from at least one switch positioned adjacent the handlebars of the motorcycle.

17. The stereo system of claim 15, wherein the interface device is adapted to receive the at least one command signal and is further adapted to produce a wireless signal to the replacement aftermarket stereo receiver corresponding to the at least one command signal.

18. The stereo system of claim 15, wherein the replacement aftermarket stereo receiver is adapted to receive a first wireless signal from a handheld remote control upon a user depressing a first function key on the handheld remote control to change a first function of the operation of the replacement aftermarket stereo receiver and wherein the interface device produces the functional equivalent remote control signal to correspond to the first wireless signal in response to the at least one command signal.

19. The stereo system of claim 18, wherein the interface device includes a memory and is programmable such that the interface device can sequentially store wireless signals corresponding to the at least one remote control signal such that subsequent reception of the command signal results in a corresponding wireless signal being transmitted to the replacement aftermarket stereo receiver.

20. The stereo system of claim 19, wherein the interface device includes a program mode wherein the interface device can be programmed by a programmer.

21. The stereo system of claim 20, wherein the interface device includes a wireless receiver and a wireless transmitter so that the interface device can receive the first wireless signal from the handheld remote control and store a corresponding signal in the memory such that the interface device can recall the stored signal and thereby generate a wireless signal corresponding to the first wireless signal so as to change the first function of the replacement aftermarket stereo receiver.

* * * * *